United States Patent
Carolla et al.

(10) Patent No.: US 12,122,646 B2
(45) Date of Patent: Oct. 22, 2024

(54) METHODS AND APPARATUS FOR CONSTRUCTING GLASS FURNACE REFRACTORY STRUCTURES

(71) Applicant: FOSBEL, INC., Brook Park, OH (US)

(72) Inventors: Louis Carolla, Brook Park, OH (US); Alan Bowser, Brook Park, OH (US); Kevin Lievre, Brook Park, OH (US); Dennis Cawthorn, Brook Park, OH (US)

(73) Assignee: FOSBEL, INC., Brook Park, OH (US)

( * ) Notice: Subject to any disclaimer, the term of this patent is extended or adjusted under 35 U.S.C. 154(b) by 1473 days.

(21) Appl. No.: 16/477,328

(22) PCT Filed: Jun. 22, 2018

(86) PCT No.: PCT/US2018/038949
§ 371 (c)(1),
(2) Date: Jul. 11, 2019

(87) PCT Pub. No.: WO2019/245576
PCT Pub. Date: Dec. 26, 2019

(65) Prior Publication Data
US 2021/0331899 A1 Oct. 28, 2021

(51) Int. Cl.
*B66C 6/00* (2006.01)
*B66C 7/02* (2006.01)
(Continued)

(52) U.S. Cl.
CPC ............... *B66C 17/06* (2013.01); *B66C 6/00* (2013.01); *B66C 7/02* (2013.01); *C03B 5/2375* (2013.01);
(Continued)

(58) Field of Classification Search
CPC ............. B66C 17/06; B66C 7/02; B66C 6/00; B66C 23/205; F27D 1/16
(Continued)

(56) References Cited

U.S. PATENT DOCUMENTS

| 3,326,541 A | 6/1967 | Davies et al. |
| 2010/0170865 A1* | 7/2010 | Kundel, Sr. ............... B66C 7/08 |
| | | 212/175 |

(Continued)

FOREIGN PATENT DOCUMENTS

| CN | 106 629 416 | 11/2017 |
| DE | 295 02 968 | 4/1995 |

OTHER PUBLICATIONS

PCT Application PCT/US2018/038949, International Preliminary Report on Patentability (IPRP), Dec. 22, 2020.
International Search Report and Written Opinion of the ISA for PCT/US2018/038949 mailed Mar. 19, 2019, 13 pages.
Communication Pursuant to Article 94(3) EPC, EP Application No. 18740458.7, Nov. 3, 2023.

*Primary Examiner* — Vivek K Shirsat
(74) *Attorney, Agent, or Firm* — NIXON & VANDERHYE P.C.

(57) ABSTRACT

Methods and apparatus for constructing or reconstructing refractory structures, e.g., glass furnace regenerator structures and/or glass furnace structures having walls formed of refractory block and buck stays externally supporting the walls are provided. A header support beam assembly is provided so as to extend at an angle between respective pairs of side wall buckstays. A moveable hoist moveable hoist supporting assembly supported by the header support beam assembly and moveable between the opposed pairs of side and end walls. In such a manner, refractory components, e.g., refractory wall blocks and/or checker bricks, may be hoisted into position when constructing or reconstructing the refractory structure.

10 Claims, 14 Drawing Sheets

(51) Int. Cl.
*B66C 17/06* (2006.01)
*C03B 5/237* (2006.01)
*E04B 1/04* (2006.01)
*E04H 5/02* (2006.01)
*F27D 1/16* (2006.01)

(52) U.S. Cl.
CPC ................. *E04H 5/02* (2013.01); *F27D 1/16* (2013.01); *E04B 1/04* (2013.01)

(58) Field of Classification Search
USPC .............................. 431/202; 212/324; 264/34
See application file for complete search history.

(56) References Cited

U.S. PATENT DOCUMENTS

| | | | |
|---|---|---|---|
| 2013/0167749 A1* | 7/2013 | Spies ........................ | B66C 7/02 |
| | | | 104/93 |
| 2013/0167750 A1* | 7/2013 | Spies ........................ | B66C 7/08 |
| | | | 104/93 |
| 2016/0032601 A1* | 2/2016 | McCaffrey .......... | E04B 1/34823 |
| | | | 264/34 |
| 2016/0083230 A1* | 3/2016 | Chambers ................. | C03B 5/42 |
| | | | 29/897 |
| 2016/0221801 A1* | 8/2016 | Carolla ................. | C03B 5/2375 |
| 2018/0229980 A1* | 8/2018 | Givens ...................... | B66C 7/02 |
| 2019/0062128 A1* | 2/2019 | Yin .......................... | B66C 6/00 |

\* cited by examiner

METHODS AND APPARATUS FOR CONSTRUCTING GLASS FURNACE REFRACTORY STRUCTURES

This application is the U.S. national phase of International Application No. PCT/US2018/038949 filed Jun. 22, 2018 which designated the U.S., the entire content of which is hereby incorporated by reference.

FIELD

The embodiments disclosed herein relate generally to methods and apparatus for constructing refractory structures associated with glass furnaces, e.g., glass furnace regenerators.

BACKGROUND

In the manufacturing process for making glass, raw materials including sand, lime, soda ash and other ingredients are fed into a furnace, sometimes called a glass tank. The raw materials are subjected to temperature above about 2,800° F. in the glass furnace which causes the raw materials to melt and thereby form a molten bed of glass that exits the glass furnace for further downstream processing into glass products.

The most common way of heating the glass furnace is through the combustion of a hydrocarbon fuel source, such as natural gas or oil. The hydrocarbon fuel is mixed with combustion air inside the furnace and combusted to thereby transfer the combustion heat energy to the raw materials and glass melt prior to exiting the furnace.

In order to improve the thermal efficiency of the combustion process, the combustion air used to combust the fuel is preheated by means of regenerator structures. More specifically, a supply of combustion air is preheated in a honeycombed pack of checker bricks contained within the interior of the regenerator structure. Fresh combustion air is drawn up through the pack of heated checker bricks in the regenerator structure and preheated by means of heat transfer. The pre-heated combustion air may then be mixed with the fuel, combusted. Waste combustion gas exits the glass furnace and passes through a second regenerator structure. As the waste gasses pass through the second regenerator the checkers in the pack are heated by means of heat transferred from the waste gas. After a predetermined time has elapsed (e.g., after about 15-30 minutes), the process cycle is reversed so that the checker bricks in one of the regenerator structures that were being heated by heat transfer with the waste gas are then used to preheat the fresh combustion air while the checker bricks in the other regenerator structures that were used to preheat the combustion air are then re-heated by heat transfer with the waste combustion gas. See in this regard, U.S. Pat. No. 3,326,541 (the entire content of which is expressly incorporated hereinto by reference).

The current process for building glass furnace refractory structures, e.g., regenerators, glass furnaces, fore hearths and the like, is very labor intensive taking many weeks as it requires the placement of hundreds of thousands of refractory bricks that may be individually coated with mortar and positioned or in some cases essentially dry set with minimal (if any) mortar. As is well known in the glass making industry, the joints associated with the bricks of the furnace refractory structures are the weakest part of the structure and are consequently more readily susceptible to degradation by the corrosive hot gasses passing therethrough. As the brick joints begin to erode, the walls forming the refractory structure face increased attack as the corrosive gasses begin to condense and dissolve the refractory materials forming the bricks thereby weakening the structure. As the structure becomes weakened, the glass furnace itself may become compromised and fail which could then require a complete shut down and rebuilding operation.

It can be appreciated therefore, that if the refractory structures could be fabricated from larger refractory blocks, then fewer joints would ensue thereby prolonging the regenerator structure's useful life and minimizing down time due to rebuilding. However, while large refractory blocks can be fabricated by pressing, molding or casting a refractory material, it is problematic to install such blocks during construction of a large-scale refractory structure.

In addition to the problems noted above, many of the components of the refractory structure, e.g., checker bricks used in glass regenerator structures, need to be replaced near or at the end of their useful life in order to maintain optimal production efficiencies. It is currently difficult to replace such components, e.g., the checker bricks, when it may be desired for them to do so.

Methods and apparatus to construct glass furnace regenerators have recently been proposed in commonly owned U.S. Patent Application Publication No. US 2016/0083230 (the entire content of which is expressly incorporated hereinto by reference) whereby opposed pairs of supports are connected to at least a respective one of the vertically oriented buck stays with cross-support beams spanning the refractory structure between a respective pair of the supports. An overhead crane assembly may thus be supported by the cross-support beams so as to assist in the movement and placement of large refractory blocks and/or checker bricks when constructing or repairing a glass furnace regenerator.

While the proposals provided by the above-noted U.S. Patent Application Publication No. US 2016/0083230 provide a significant advance in this art, continued improvements of such proposals are still desired in order that refractory structures may be constructed and/or re-built efficiently and economically. It is towards providing such improvements that the embodiments of the present invention are directed.

SUMMARY

In general, the embodiments disclosed herein are directed toward methods and apparatus for constructing or reconstructing refractory structures, e.g., glass furnace regenerator structures and/or glass furnace structures having walls formed of refractory block and buck stays externally supporting the walls are provided. A header support beam assembly is provided so as to extend at an angle between respective pairs of side wall buckstays. A moveable hoist supporting assembly supported by the header support beam assembly and moveable between the opposed pairs of side and end walls. In such a manner, refractory components, e.g., refractory wall blocks and/or checker bricks, may be hoisted into position when constructing or reconstructing the refractory structure.

According to certain embodiments, the header support beam assembly may comprise header support beams having a proximal terminal end attached to a respective one of the side wall buckstays and an opposite distal terminal end attached to a respective one of the end wall buckstays so as to form an outwardly angulated header support structure relative to the interior space of the regenerator. The header support beams may therefore extend between side wall buckstays associated with opposite side walls of the refractory structure, wherein the header support beams extend are oriented at a non-perpendicular angle relative to the side walls of the refractory structure.

Certain embodiments herein will include header support beams comprised of a pair of opposed header beam members that are spaced apart parallel to one another so as to define a space therebetween. A plurality of strap assemblies spaced apart along a spanwise extent of the header beam members so as to maintain the spaced apart parallel therebetween. According to some embodiments, the header beam members will comprise C-shaped beams that are oppositely oriented relative to one another.

In those embodiments wherein parallel header support beams are provided, the apparatus may include a pair of hanger assemblies for dependently supporting the rail assemblies to the header beam members. The hanger assemblies may advantageously comprise a pair of hanger rods extending through the space defined between the header beam members. The hanger assemblies may comprise a pair of hanger rods extending through the space defined between the header beam members. According to certain specific embodiments, the hanger assemblies may include an upper header plate bearing against upper flange surfaces of the header beam members and a sole support plate for supporting a respective one of the rail assemblies, wherein the hanger rods extend through the space between the header beam members so as to compressively couple the upper head and sole support plates of the hanger assemblies.

A pair of laterally spaced-apart parallel elongate rail assemblies, and a bridge support dependently connected to the rail assemblies for movement in a longitudinal direction of the rail assemblies may be provided. Carriages may be provided so as to operatively dependently couple the bridge support to the rail assemblies to allow reciprocal movement of the bridge support in the longitudinal direction of the rail assemblies. The bridge support may be provided with a transverse carriage member mounted to the bridge support for reciprocal transverse movements relative to the longitudinal direction of the rail assemblies.

Buck stay adapter assemblies may be attached to upper terminal ends of the respective pair of side wall buckstays, wherein the buck stay adapter assemblies include a top plate, and wherein the header support beam assembly is rigidly connected to the top plate of the buck stay adapter assemblies. The buck stay adapter assemblies may comprise top plates, wherein the proximal and distal terminal ends of the header support beams are respectively rigidly attached to the top plates.

These and other aspects and advantages of the present invention will become more clear after careful consideration is given to the following detailed description of the preferred exemplary embodiments thereof.

BRIEF DESCRIPTION OF ACCOMPANYING DRAWINGS

The disclosed embodiments of the present invention will be better and more completely understood by referring to the following detailed description of exemplary non-limiting illustrative embodiments in conjunction with the drawings of which.

DETAILED DESCRIPTION

Figure 1:
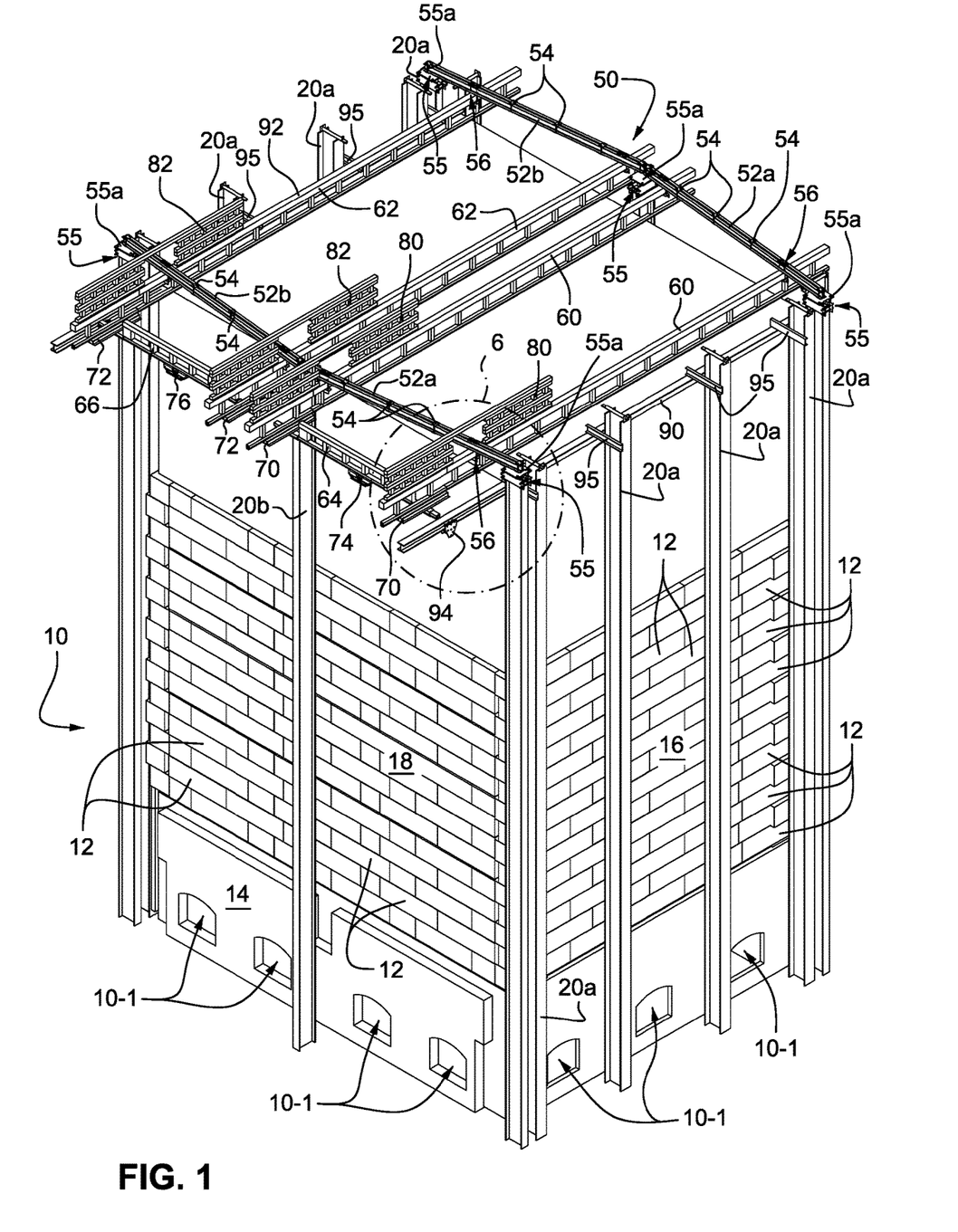
FIG. 1 is a front end perspective view of a regenerator structure showing an apparatus in accordance with an embodiment of the present invention.
Figure 2:
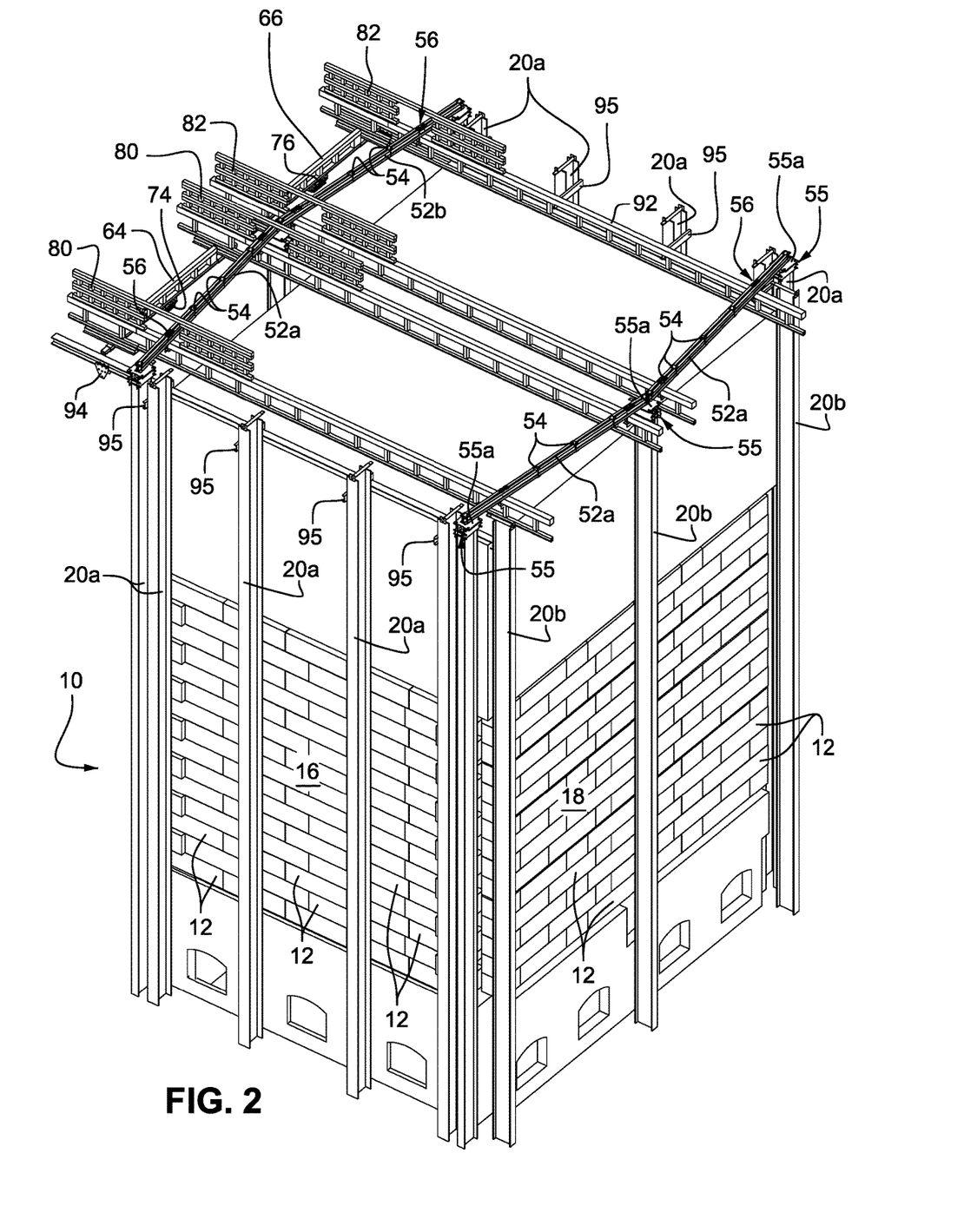
FIG. 2 is a rear end perspective view of the regenerator structure and apparatus depicted in FIG. 1.
Figure 3:
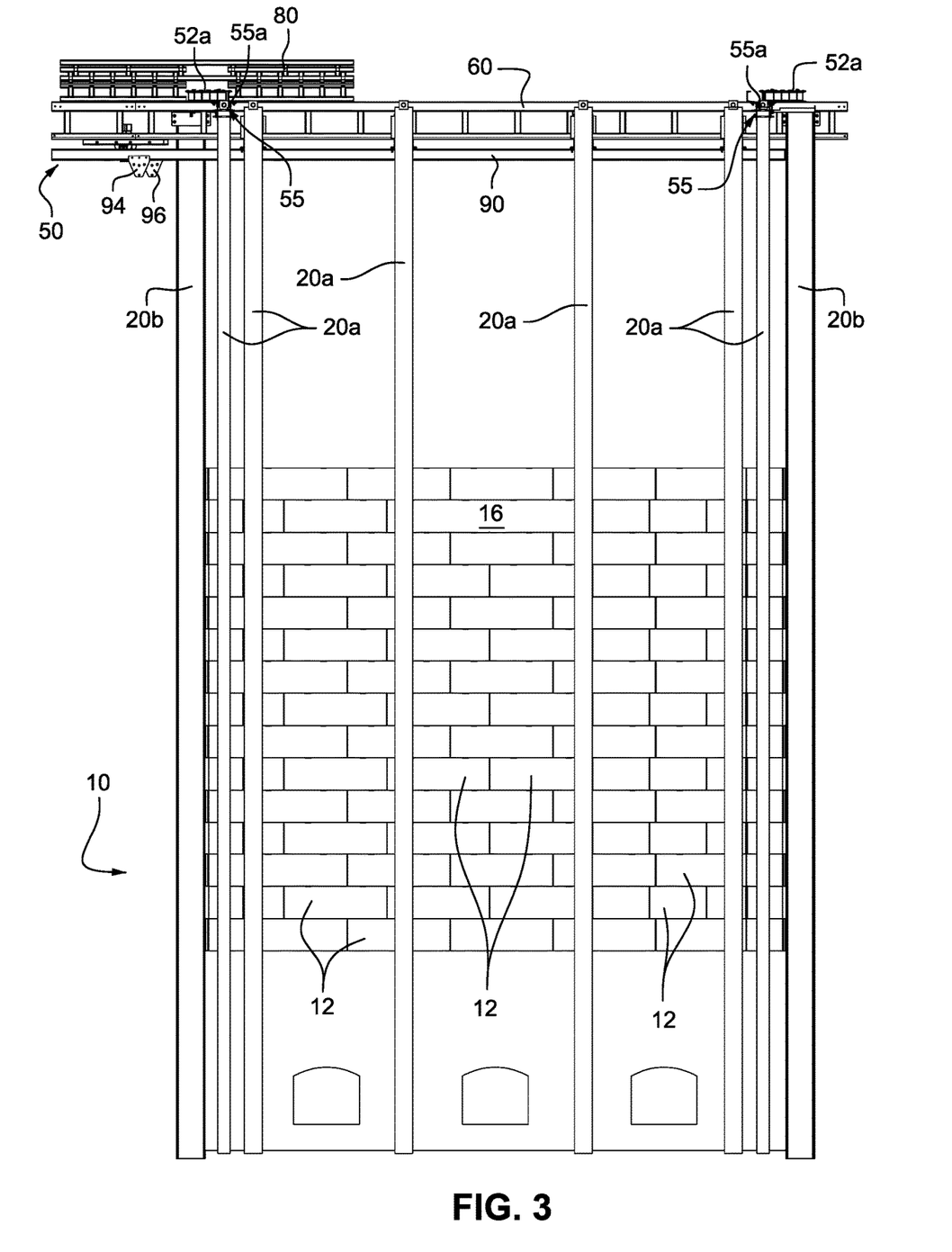
FIGS. 3 and 4 are side and front elevational views, respectively, of the regenerator structure and apparatus depicted in FIG. 1.
Figure 4:
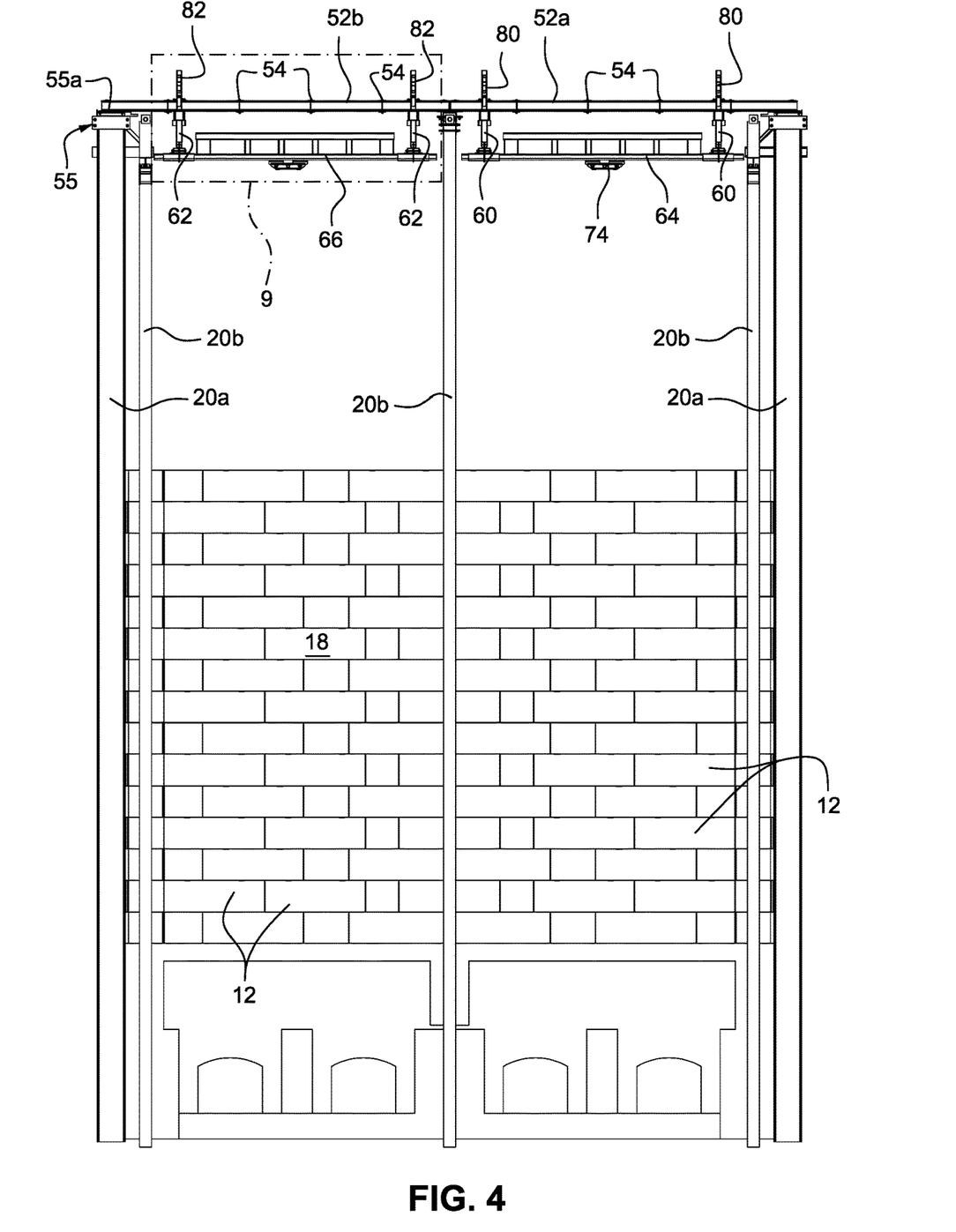
Figure 5:
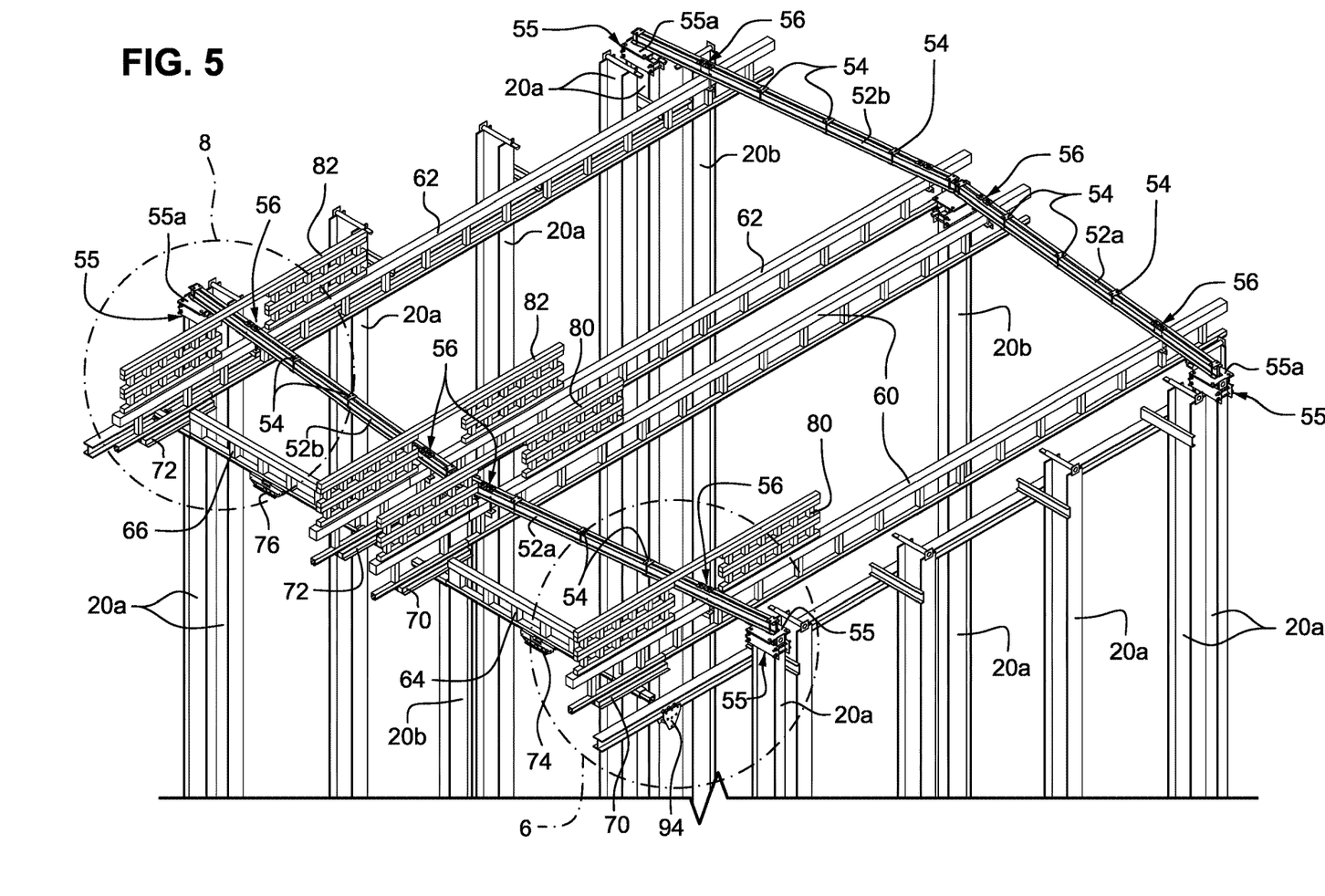
FIG. 5 is a top front end elevational view of the apparatus depicted in FIG. 1 in a more enlarged scale for clarity of description.

Accompanying FIG. 1 schematically depicts a perspective view of a regenerator structure 10 showing an overhead crane supporting apparatus 50 in accordance with an embodiment of the present invention. As shown, the regenerator structure 10 is constructed of large pre-cast refractor blocks (a few of which are identified by reference numeral 12) stacked on a foundation 14 to thereby form side and end walls 16, 18, respectively. It will be appreciated that the regenerator structure 10 is used in operative combination with a glass furnace (not shown). The regenerator structure 10 generally depicted in the accompanying FIGS. 1-10B is of a type used for end-fired glass furnaces. However, the attributes of the embodiments of the invention to be described herein are equally applicable to other glass furnace designs, e.g. side-fired glass furnaces such as those depicted in FIGS. 11-12.

The regenerator structure 10 includes a series of ports 10-1 which are used to introduce pre-heated combustion air into the glass furnace (not shown) or to exhaust combustion gas from the furnace depending on the operational cycle. The side and end walls 16, 18 are structurally supported by external upright structural beams known colloquially as buck stays 20a, 20b, respectively. Although not shown in the FIGURES, those skilled in this art will recognize that the buck stays 20 are compressively held against the walls by means of tie rods extending between opposed pairs of buck stays 20 latitudinally and/or longitudinally relative to the regenerator structure 10.

FIG. 1 depicts a state whereby the walls 16, 18 have been constructed of relatively large monolithic refractory blocks 12 with the checker bricks 24 (see FIG. 10) being stacked within the interior space of the regenerator structure 10. The apparatus 50 may thus be employed so as to install the refractory blocks 12 when forming the walls 16, 18 and thereafter employed so as to install the checker bricks 24 within the interior defined by such walls 16, 18.

The overhead crane apparatus 50 in accordance with an embodiment of the invention is depicted in FIGS. 1-10B and includes opposed pairs of cross-support header beams 52a, 52b each extending from the top end of a respective side wall buckstay 20a to the top end of an end wall buckstay 20b. The opposed pairs of cross-support header beams 52a, 52b thereby form an outwardly angulated header support structure relative to the interior space of the regenerator 10. In such a manner, therefore, the interior space of regenerator 10 is open to the placement of the checker bricks 24.

The terminal ends of the header beams 52a, 52b are rigidly attached (e.g., via welding) to a respective top plate 55a associated with a buck stay adapter assembly 55. The adapter assemblies may therefore be connected to the upper end of the buck stays 20a, 20b by suitable compression bolt/plate members to thereby support the header beams 52a, 52b above the regenerator structure 10.

Figure 6:
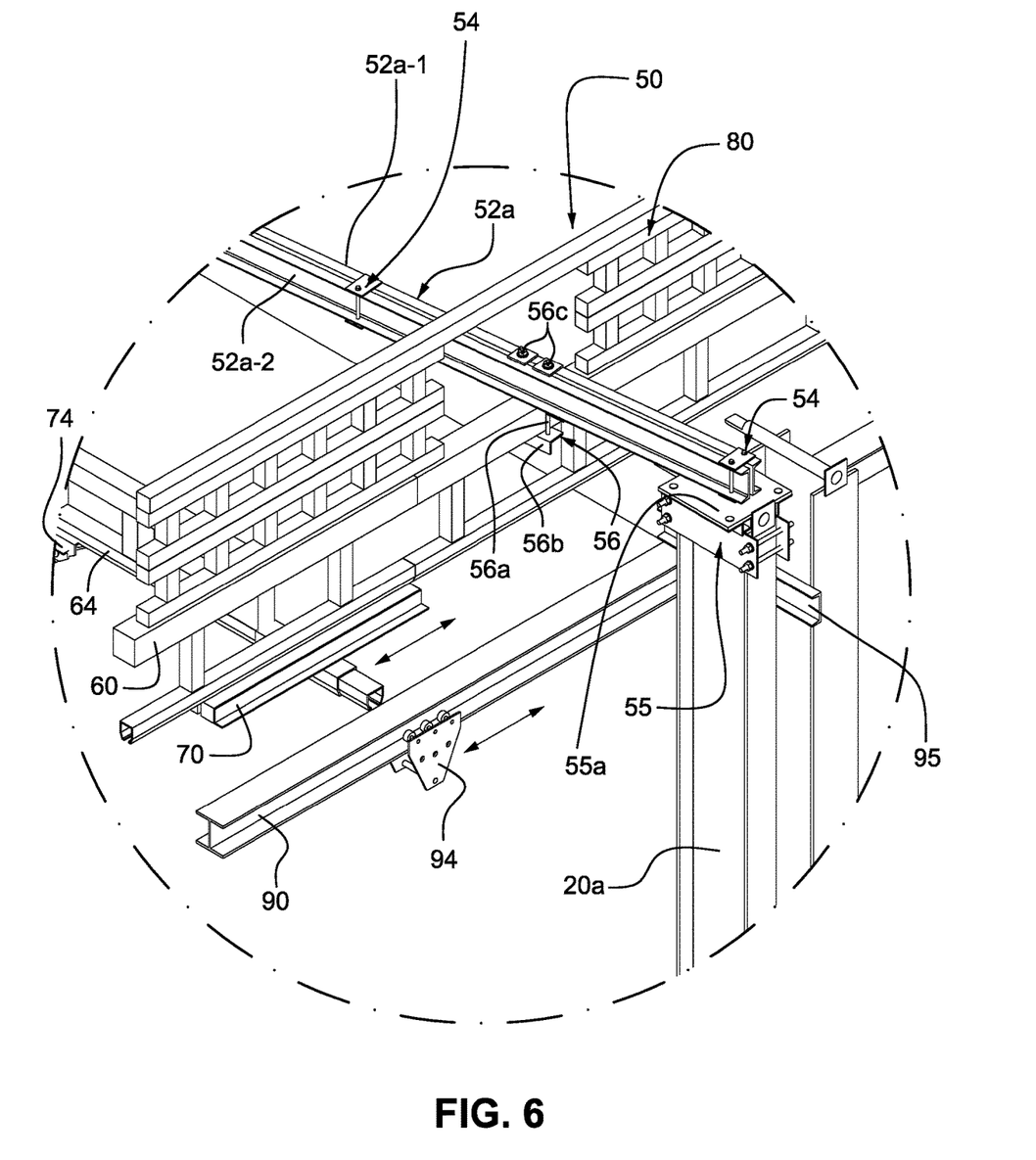
FIG. 6 is an enlarged detailed perspective view of a front portion of the apparatus as noted by the dot-dash encircled portion in FIG. 5.
Figure 7:
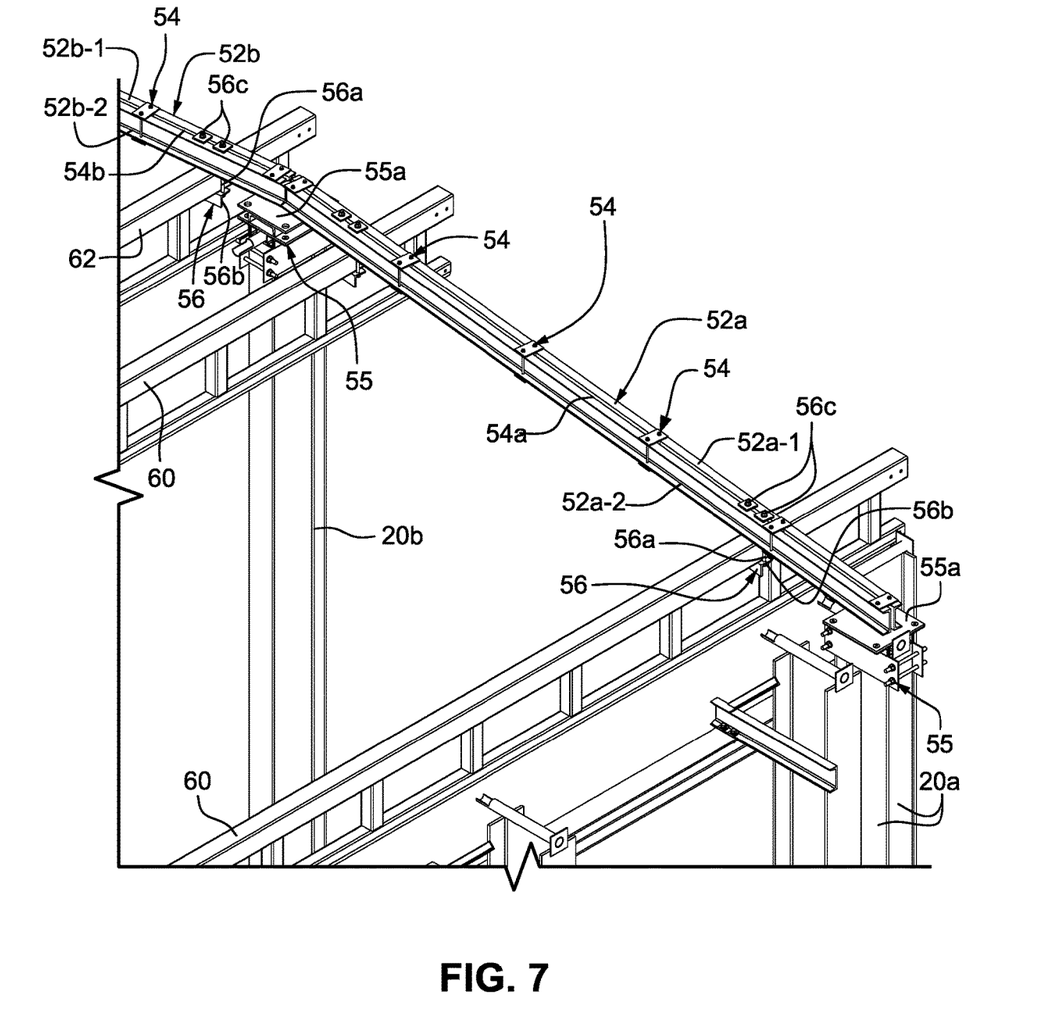
FIG. 7 is an enlarged detailed perspective view of a rear portion of the apparatus as depicted in FIG. 5.
Figure 8:
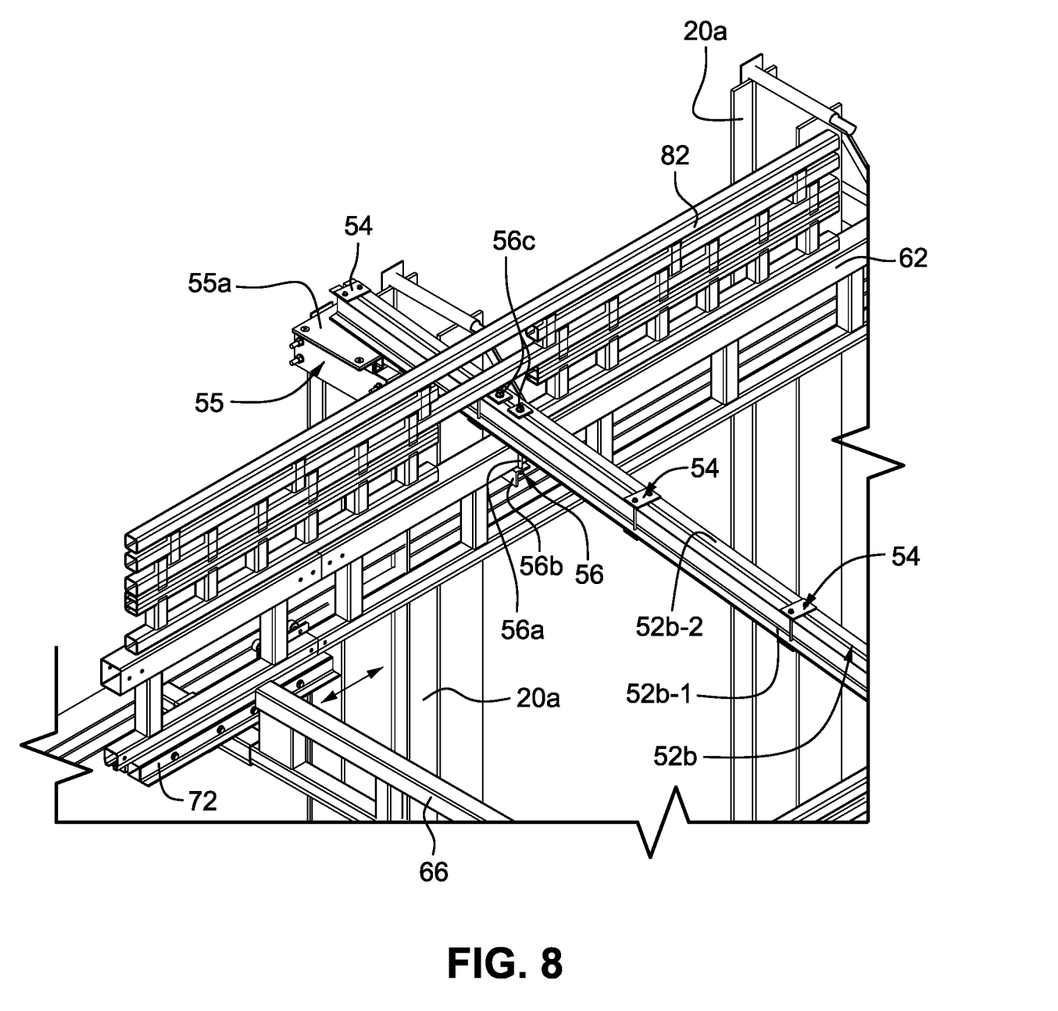
FIG. 8 is an enlarged detailed perspective view of a portion of the apparatus as noted by the dot-dash encircled portion in FIG. 5.
Figure 9:
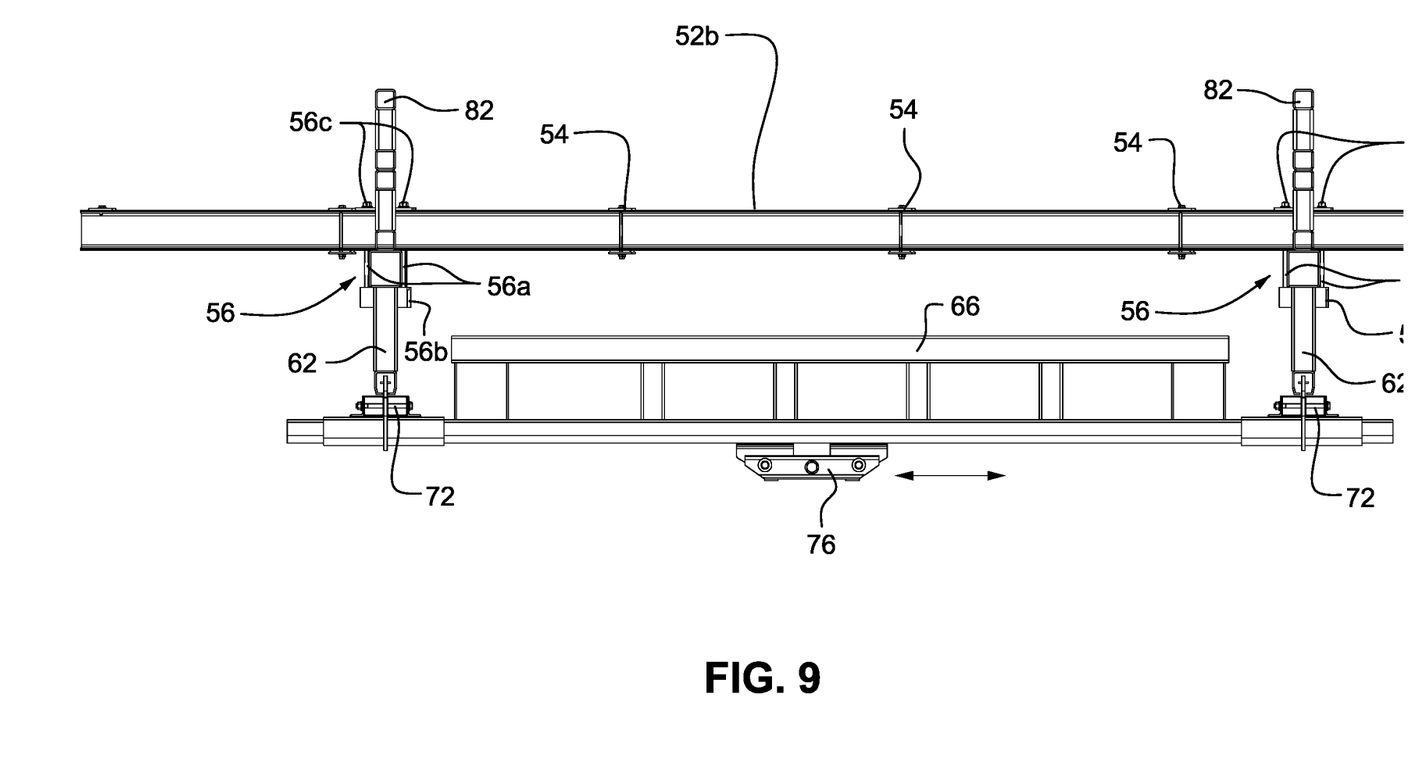
FIG. 9 is an end elevational view showing the detailed structural arrangements of the overhead traversing beams and crane support structures as noted by the dot-dash encircled portion in FIG. 4.
Figure 10:
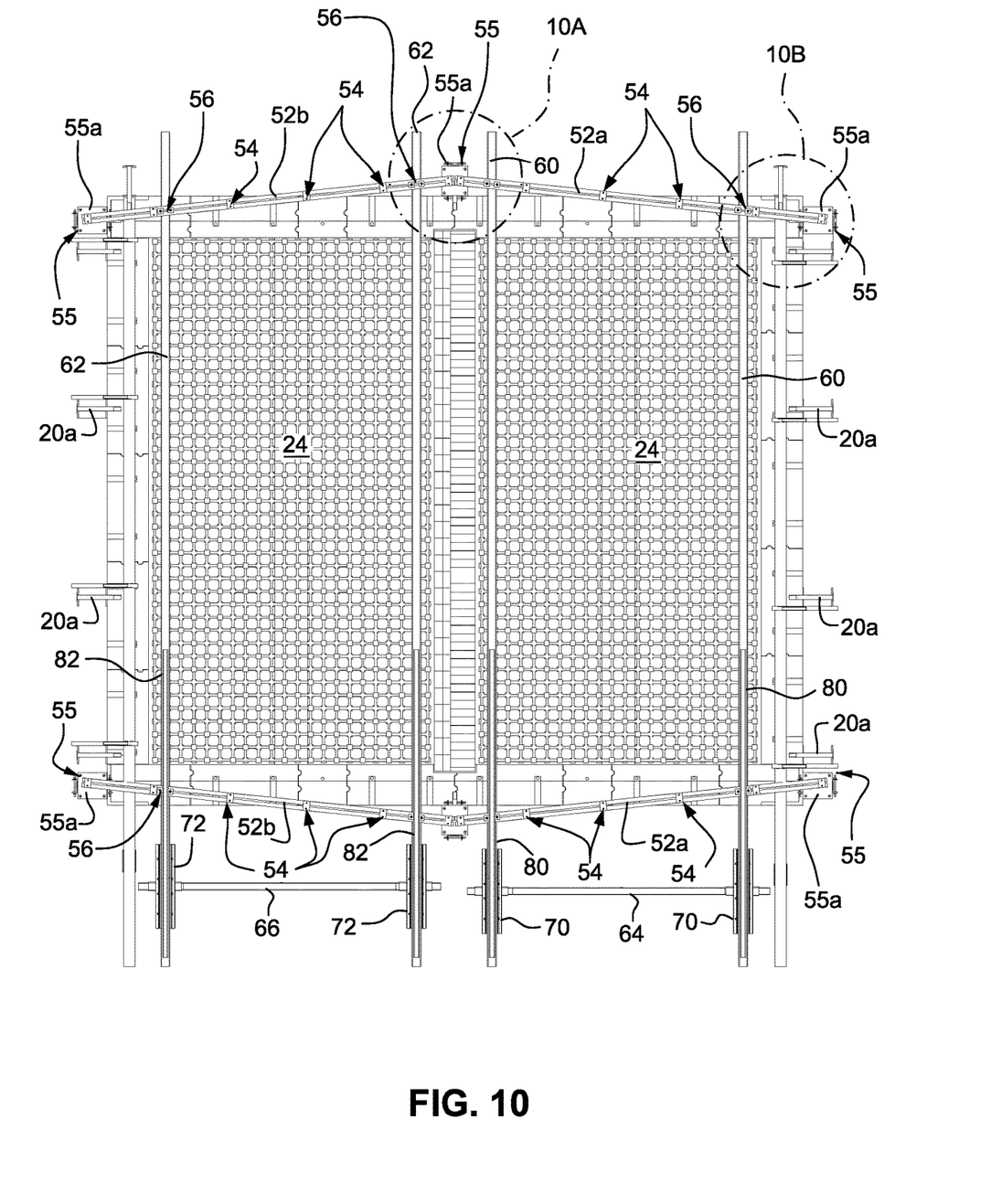
FIG. 10 is an overhead plan view of the regenerator structure and apparatus depicted in FIG. 1.
Figure 10A:
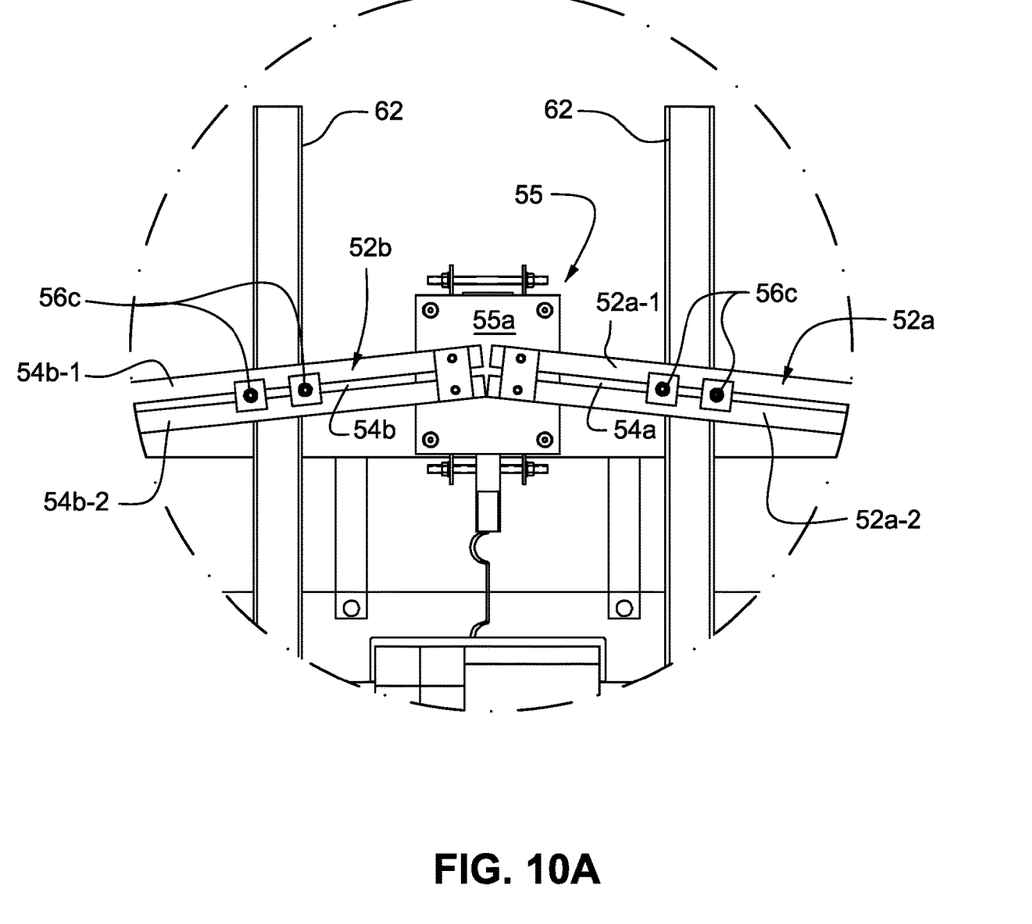
FIGS. 10A and 10B are enlarged overhead plan views of the apparatus noted in dot-dash encircled portions in FIG. 10.
Figure 10B:
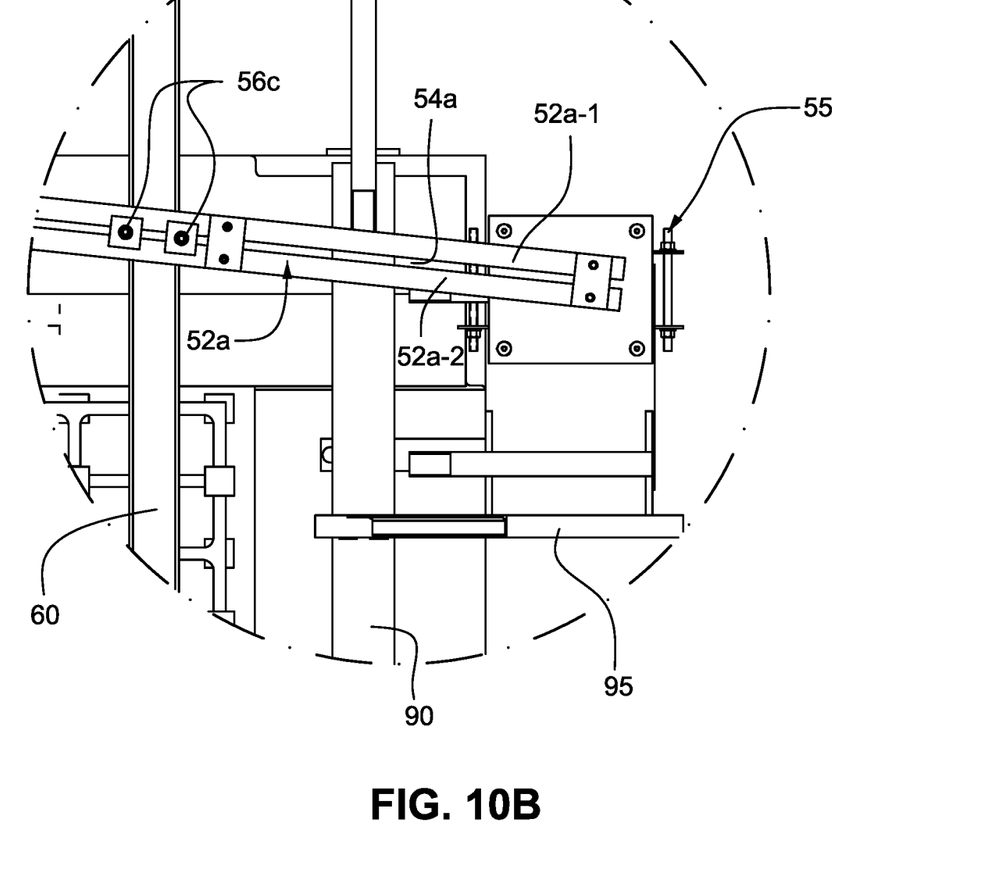

As is perhaps more clearly depicted in accompanying FIGS. 6-7, each of the cross-support header beams 52a, 52b is comprised of oppositely oriented C-shaped beams 52a-1, 52a-2 which are positionally maintained relative to one another by a series of strap assemblies 54 along the lengthwise span thereof. It is noted that while the focus of the discussion hereinbelow is on the C-shaped beams 52a-1 and 52a-2 with respect to the cross-support header beam 52a in the interests of clarity, it will be understood that the cross-support header beam 52b will likewise possess a similar structural arrangement and include a pair of oppositely oriented C-shaped beams 52b-1 and 52b-2 (see, for example, FIGS. 7 and 10A).

The strap assemblies 54 rigidly connect the beams 52a-1, 52a-2 and 52b-1, 52b-2 in rigid parallel alignment with one another and also provide a spacer element therebetween so as maintain a separation space 54a and 54b between the beams 52a-1, 52a-2 and 52b-1, 52b-2, respectively. The strap assemblies 54 are preferably provided with opposed plates that are connected to one another by bolts to compressively maintain the positional relationship between the parallel beams 52a1, 52a-2, 52b-1, 52b-2. A spacer element may be provided with each of the plates so as to establish the dimension of the spaces 54a, 54b between the parallel beams 52a1, 52a-2, 52b-1, 52b-2. The separation spaces 54a, 54b thereby allow the hanger rods 56a (which may take the form of elongate structural bolts) associated with the hanger assemblies 56 to extend therethrough below the beams 52a-1, 52a-2 for connection with a sole support plate 56b. The hanger rods 56a are in turn dependently supported by upper header plates 56c bearing against the upper flange surfaces of the C-shaped header beams 52a-1, 52a-2. The hanger assemblies 56 are therefore capable of being moved in directions along the lengthwise span of the C-shaped beams 52a-1, 52a-2 by virtue of the hanger rods 56a being positioned within the spaces 54a, 54b as the case may be. This positional adjustment of the hanger assemblies 56 along the span of the header beams 52a, 52b is therefore permitted as may be needed when constructing the overhead crane assembly 50 for specific dimensional attributes and positional requirements of the regenerator structure 10.

The hanger assemblies 56 dependently support parallel elongate rail assemblies 60, 62 extending over the regenerator 10 between the end walls 18. Bridge supports 64, 66 are moveably attached at each end thereof to a pair of the rail assemblies 60, 62 by carriages 70, 72, respectively. Transverse carriage members 74, 76 are moveably mounted to the bottom of each of the bridge supports 64, 66 so as to be reciprocally moveable along the span of such supports 64, 66 between the pairs of elongate rail assemblies 60, 62, respectively. In such a manner, therefore a hoist system (not shown) may be attached to the transverse carriage members 74, 76 so as to be reciprocally moveable latitudinally between the rail assemblies 60, 62. Movement of the bridge supports 64, 66 will therefore also allow the hoist system (not show) to be reciprocally moved longitudinally between the opposed ends 18 of the regenerator 10. Such freedom of movements will thereby allow proper placement of wall blocks 12 and/or checker bricks 24 in the construction or reconstruction of the regenerator 10.

As shown, the rail assemblies 60, 62 extend outwardly beyond one of the end walls 18 so as to allow the hoist system (not show) to be capable of retrieving construction materials outside the walls 18. In order to physically support such extension of the rail assemblies 60, 62, a supporting truss system 80, 82 is rigidly installed over an upper span portion of each rail assembly 60, 62.

A pair of lateral I-beam rails 90, 92 may be provided with corresponding moveable carriage members 94, 96 along an interior face of the side wall buck stays 20a. The rails 90, 92 may be physically connected to the buck stays 20a by means of support posts 95 welded to a side thereof. The carriage members 94, 96 thereby allow another hoist system (not shown) to be provided so as to position construction materials (e.g., blocks 12 and/or checker bricks 24) as may be desired.

Figure 11:
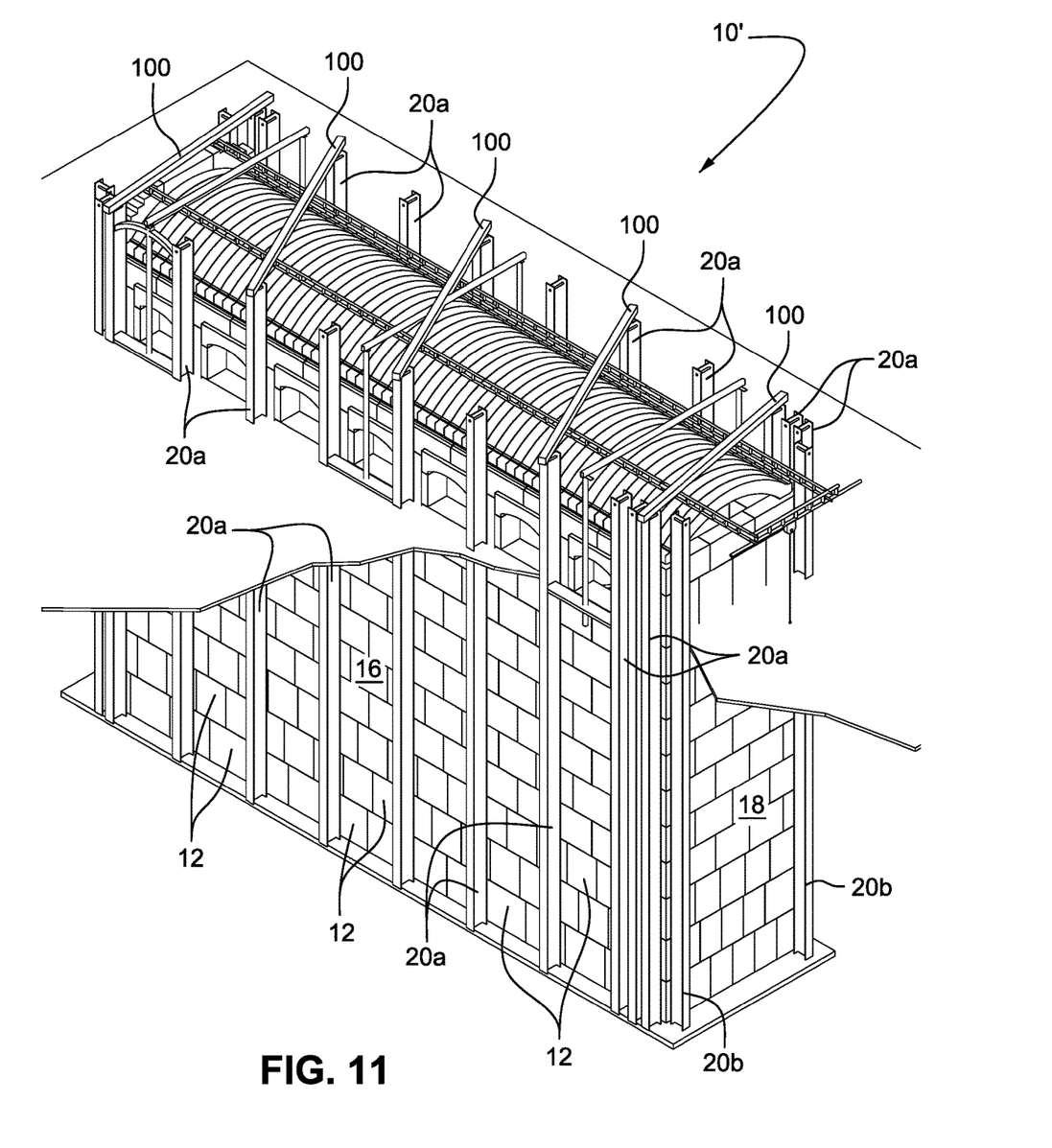
FIGS. 11-12 are perspective views of alternative embodiments of an apparatus according to the invention.
Figure 12:
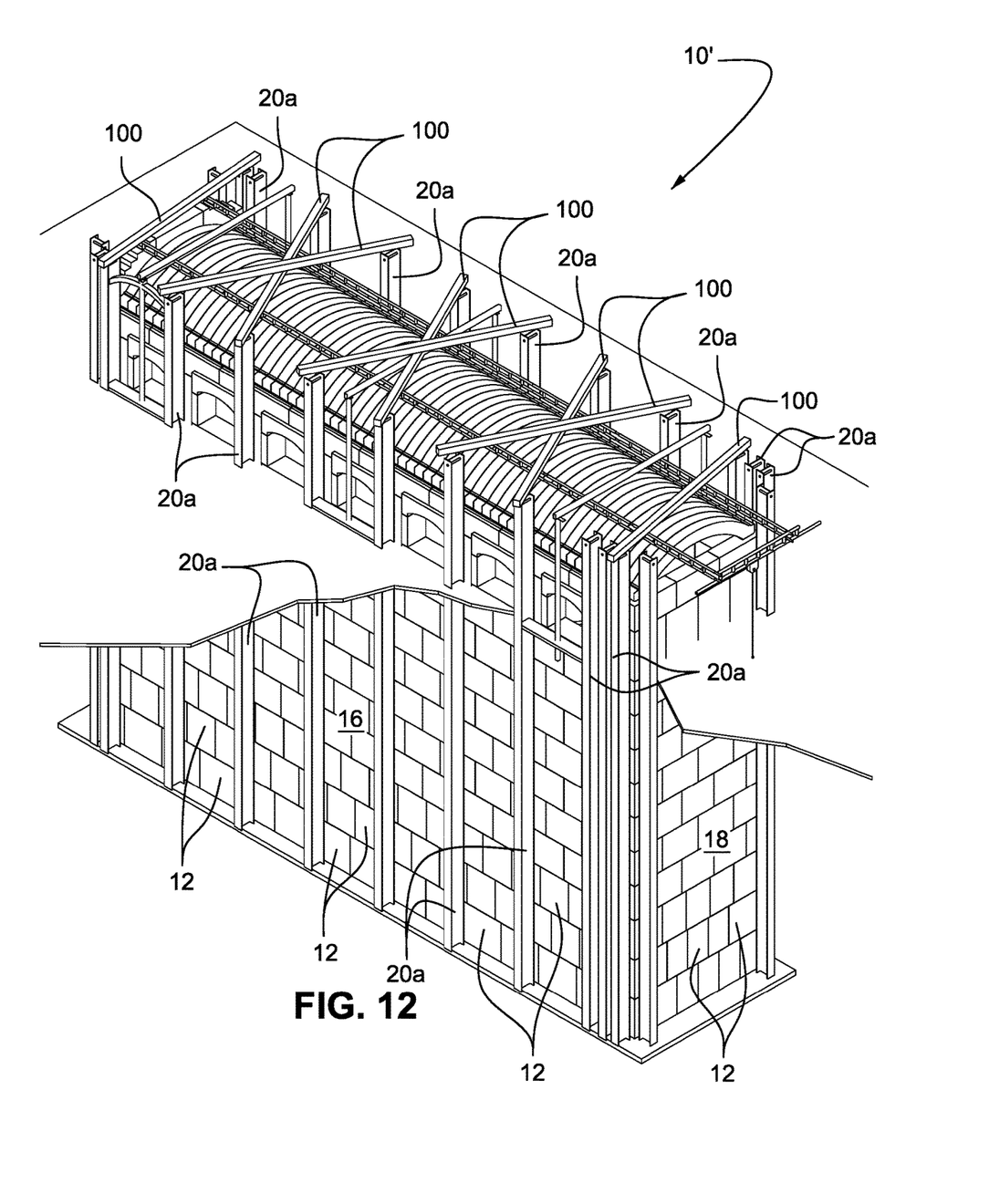

Accompanying FIGS. 11 and 12 depict alternative embodiments of the assembly 50 described above. In this regard, it will be apparent that the header support beams 100 may extend at a non-perpendicular angle between respective off-set pairs of side wall buckstays 20a as shown in FIG. 11. In FIG. 12, additional header support beams 102 are provided between off-set pairs of side wall buckstays 20a so as to form an X-shaped header support structure which may be desirable for certain refractory structures 10' so as to improve/increase stability of the apparatus.

It will therefore be understood that the description provided herein is presently considered to be the most practical and preferred embodiments of the invention. Thus, the invention is not to be limited to the disclosed embodiments, but on the contrary, is intended to cover various modifications and equivalent arrangements included within the spirit and scope thereof.

What is claimed is:

1. An apparatus to assist in construction of a refractory structure formed of refractory components having vertically oriented side wall and end wall buck stays externally supporting opposed pairs of side and end walls, respectively, defining an interior space of the refractory structure, wherein the apparatus comprises:

a header support beam assembly extending at a non-perpendicular angle between respective pairs of side wall buckstays; and a moveable hoist supporting assembly supported by the header support beam assembly and moveable between the opposed pairs of side and end walls, a pair of laterally spaced-apart parallel elongate rail assemblies extending over the interior space of the refractory structure, and a bridge support dependently connected to the rail assemblies for movement in a longitudinal direction of the rail assemblies, wherein the header support beam assembly comprises:

(a) a pair of opposed header support beam members that are spaced apart parallel to one another so as to define a space therebetween, each of the support beam members having a proximal terminal end attached to a respective one of the side wall buckstays and an opposite distal terminal end attached to a respective one of the end wall buckstays so as to form an outwardly angulated header support structure relative to the interior space of the refractory structure, (b) a pair of hanger assemblies for dependently supporting the rail assemblies to the header support beam members, wherein each of the hanger assemblies includes:
  (b1) a pair of hanger rods extending through the space defined between the header support beam members,
  (b2) an upper header plate bearing against upper flange surfaces of the header support beam members, and
  (b3) a sole support plate for supporting a respective one of the rail assemblies, wherein
    the hanger rods extend through the space defined between the header support beam members so as to compressively couple the upper header support plate and the sole support plate of each of the hanger assemblies.

2. The apparatus according to claim 1, wherein the header support beam assembly further comprises a plurality of strap assemblies spaced apart along a spanwise extent of the header support beam members so as to maintain the spaced apart parallel therebetween.

3. The apparatus according to claim 2, wherein the header support beam members comprise C-shaped beams that are oppositely oriented relative to one another.

4. The apparatus according to claim 1, further comprising carriages operatively dependently coupling the bridge support to the rail assemblies to allow reciprocal movement of the bridge support in the longitudinal direction of the rail assemblies.

5. The apparatus according to claim 1, further comprising buck stay adapter assemblies attached to upper terminal ends of the respective ones of the side and end wall buckstays to rigidly attach the proximal and distal terminal ends of the header support beam members thereto, respectively.

6. The apparatus according to claim 5, wherein the buck stay adapter assemblies comprise top plates, wherein the proximal and distal terminal ends of the header support beams are respectively rigidly attached to the top plates.

7. The apparatus according to claim 1, wherein the bridge support comprises a transverse carriage member mounted to the bridge support for reciprocal transverse movements relative to the longitudinal direction of the rail assemblies.

8. The apparatus according to claim 1, wherein an end portion of the rail assemblies extends beyond at least one of the end walls.

9. The apparatus according to claim 8, wherein the rail assemblies comprise a truss support for supporting the end portion thereof extending beyond at least one of the end walls.

10. The apparatus according to claim 1, wherein the apparatus comprises an adjacent pair of the header support beam assemblies, and a moveable hoist supporting assembly operatively associated with each adjacent pair of the header support beam assemblies.

\* \* \* \* \*